Jan. 3, 1967  A. G. NELSON  3,295,508
BUILT-IN OVEN
Filed Dec. 27, 1961  2 Sheets-Sheet 1
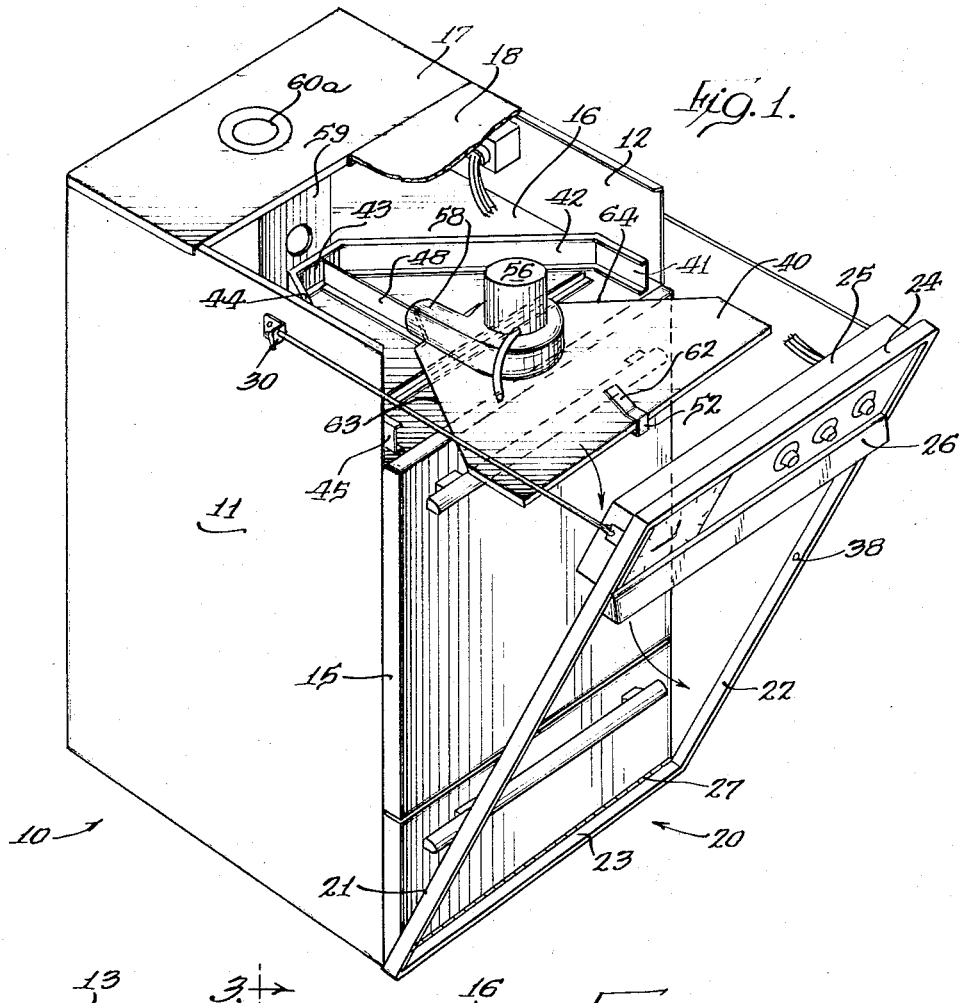
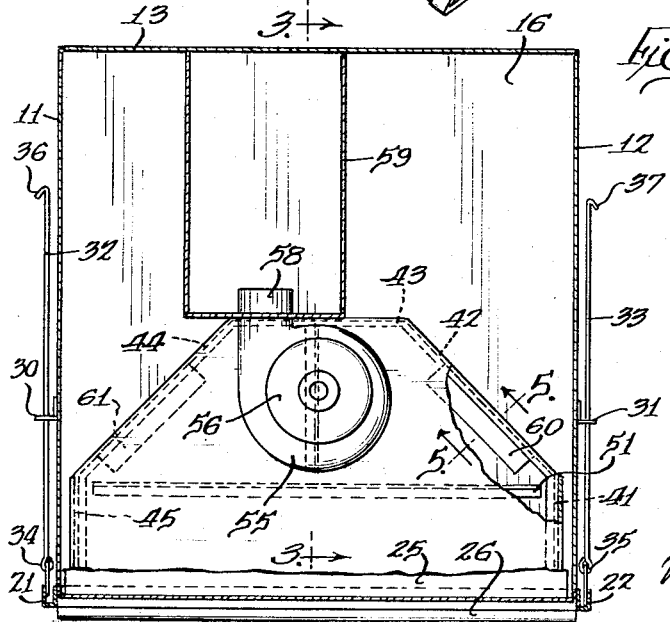
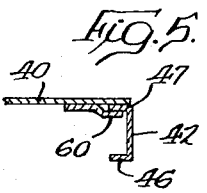
INVENTOR:
Averd G. Nelson
BY Hofgren, Brady,
Wegner, Allen & Stellman
Att'ys

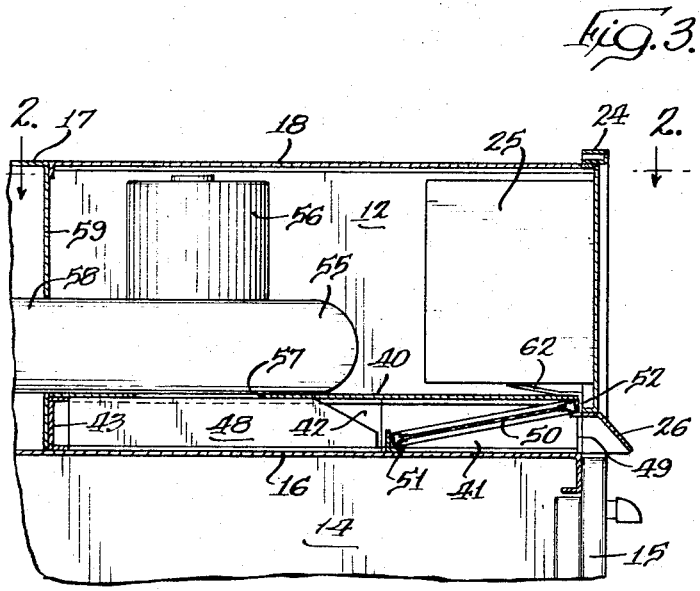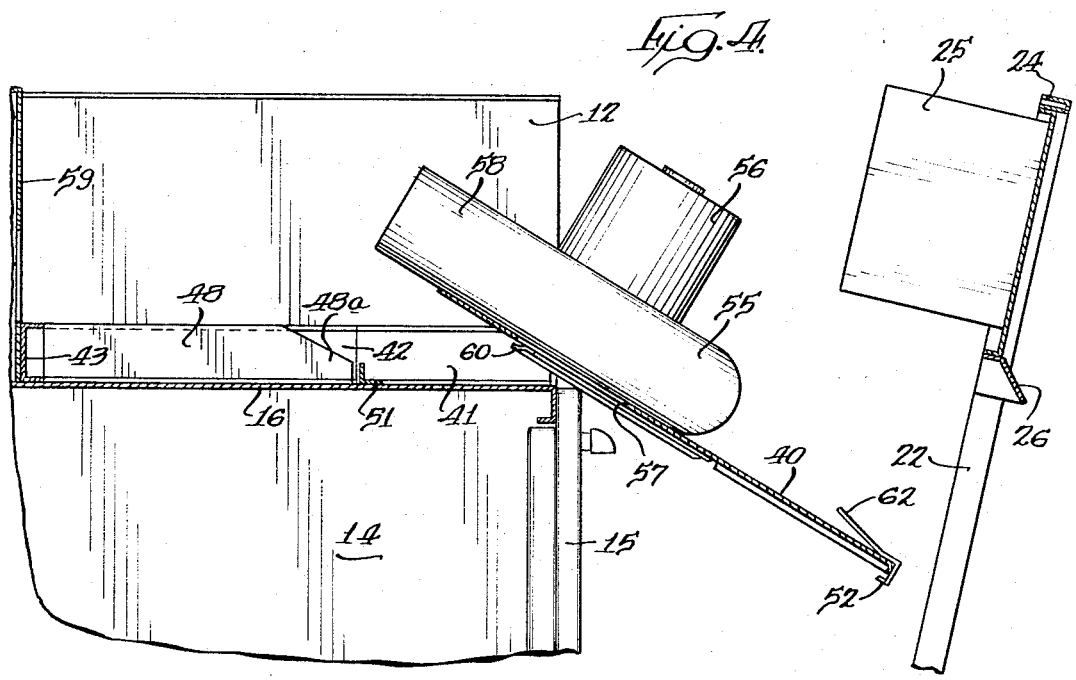

United States Patent Office 3,295,508
Patented Jan. 3, 1967

3,295,508
BUILT-IN OVEN
Averd G. Nelson, Wisconsin Rapids, Wis., assignor to Preway Inc., a corporation of Wisconsin
Filed Dec. 27, 1961, Ser. No. 162,530
10 Claims. (Cl. 126—21)

This invention relates to an oven construction and more particularly to a built-in oven which is easily cleaned and serviced.

An object of this invention is to provide a new and improved oven construction in which installation of the oven is facilitated and also cleaning and repair thereof in situ and, particularly, the air handling and filtering devices.

Another object of the invention is to provide a built-in oven having a casing with an oven chamber and an air chamber above the oven chamber with a control panel adjacent the air chamber mounted on a trim frame extending about the outer front periphery of the casing whereby movement of the trim frame provides access to the control panel and also to the air chamber.

Still another object of the invention is to provide a built-in oven construction in which a casing has an outer trim frame disposed about the front periphery of the casing and which is pivotally mounted to the casing whereby movement of the trim frame outwardly of the casing permits access to an air chamber above the oven chamber to remove a blower associated with the air chamber through the interior of the outwardly positioned trim frame for cleaning and repair thereof remote from the oven.

Another object of the invention is to provide a built-in oven as defined in the preceding paragraph in which an air filter is located in the air inlet to the air chamber and may be readily removed from the front of the oven and a top section of the oven casing is removable to permit access to a flue or vent connection at the top rear of the casing through the interior of the casing.

Further objects and advantages will become apparent from the following detailed description taken in connection with the accompanying drawings in which:

FIG. 1 is a perspective elevational view of the oven with a top section of the casing broken away and with parts of the oven shown in positions occupied during removal and replacement of the blower;

FIG. 2 is a plan section taken immediately beneath the top of the oven casing and generally along the line 2—2 in FIG. 3;

FIG. 3 is a fragmentary vertical section on an enlarged scale and taken generally along the line 3—3 in FIG. 2;

FIG. 4 is a view similar to FIG. 3 but showing the blower in the process of being removed or replaced in the oven and the positions generally corresponding to those shown in FIG. 1;

FIG. 5 is a detail section taken generally along the line 5—5 in FIG. 2.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in the drawings, an oven indicated generally at 10 has a casing with side walls 11 and 12, a rear wall 13, with an interior oven chamber 14 having an openable oven door 15 which, as known in the art, may be pivoted along its lower edge for opening movement. The top of the oven chamber 14 is defined by a horizontal panel 16 which is at a level beneath the top of the casing to provide an interior space within the casing, part of which forms an air chamber. The top of the casing is closed by a pair of cover members 17 and 18 which rest on the top of the casing side walls 11 and 12 and may be secured thereto by some form of catch means permitting ready removal of the top panels 17 and 18.

The front of the casing is finished off by an outer trim frame indicated generally at 20, having side members 21 and 22, a bottom strip 23, and a top strip 24, with these parts being connected together rigidly. The trim frame 20 is movable with respect to the casing 10 and carries a control panel 25 for the oven near the top thereof for movement therewith between the normal operative position shown in FIG. 3 in which the control panel extends into the interior of the casing and the remote position of FIGS. 1 and 4 when parts of the oven are rendered easily accessible. The trim frame also carries a heat deflector 26 which assists in directing hot air from the oven to an air chamber subsequently to be described. As shown in FIG. 1, the trim frame is movable away from the casing 10 and more particularly is pivotally movable about an axis extending along the front lower edge of the casing and as provided by a hinge, such as a piano hinge or the like, indicated at 27.

The outward movement of the trim frame is limited by stop means associated with the casing 10 and the trim frame 20 and more particularly a pair of stop members located one at each side of the casing and indicated at 30 and 31 each of which slidably receive one of a pair of links 32 and 33, respectively, which at their front ends are connected to the trim frame as indicated at 34 and 35 and which have bent ends 36 and 37 which contact the stops 30 and 31 when the frame has moved to the limit of its outward movement. The trim frame 20 is held in normal operative position as shown in FIG. 3 by screws (not shown) which pass through an opening in each of the side members 21 and 22 of the trim frame, one of which is indicated at 38 and screw into the casing 10 with access thereto being obtained by opening the oven door 15.

A part of the space above the oven chamber and within the casing 11 provides an air chamber with the bottom thereof being defined by the panel 16 and the top being defined by an air chamber cover plate 40 which in normal position rests upon support means provided by generally U-shaped flanges having successive parts 41, 42, 43, 44 and 45. This flange is shown in cross section in FIG. 5 with a lower leg 46 thereof being suitably secured to the top side of the panel 16 and the other leg 47 providing part of an interlock with the cover plate 40. A plate 48 provides an additional central support for the cover plate 40 and insures that the cover plate seats in proper position within the casing. The support means along with the panel 16 and cover plate 40 define an air chamber which has an air inlet opening indicated at 49 and which has an air filter 50 disposed thereacross for filtering the air before it passes through the air chamber. This air filter 50 is supported along its rear edge by an L-shaped bracket 51 extending across the width of the casing and secured to the top side of the plate 16 and a clip 52 secured to the forward edge of the cover plate 40. The filter can be removed from the air inlet opening and through the space immediately beneath the heat deflector 26 by a slight upward movement of the filter, as viewed in FIG. 3, to free it from the bracket 51 and then the forward edge of the filter can be dropped and withdrawn from beneath the heat deflector 26.

In order to induce air flow through the air chamber, a blower 55 driven by a motor 56 has an inlet communicating with an opening 57 in the cover plate 40 for creating a negative pressure in the air chamber and the outlet 58 of the blower communicates with a flue box 59 which has a flue connection fitting indicated at 60a.

The cover plate 40 and the blower components mounted thereon are held in place by interengagement with the side flanges 47 of the support members 42 and 44 as shown in FIGS. 2 and 5 with the interengagement being provided by elongate plates 60 and 61 secured to the underside of the cover plate. The filter holding clip 52 is formed of spring material and has a leg 62 bent upwardly from the plane of the cover plate to engage against the underside of the control panel 45 which further assists in holding the cover plate in place as shown in FIG. 3. The support components 42 and 44 provide a pair of elongate ways at opposite sides of the air chamber and they are angularly related to approach each other toward the rear of the casing and the cover plate has inwardly and rearwardly tapered sides 63 and 64 to overlie said ways when in operative position and to permit lowering and tilting of the cover plate 40 upon slight forward movement of the cover plate to clear the plate sides 63 and 64 from overlying relation with the ways. This provides for ease of removal of the cover plate and the parts associated therewith.

With the oven in place in a cabinet or the like, it is possible to remove, manually, the filter for cleaning from the front of the oven without any movement of the oven components. In order to remove the blower for cleaning and repair, the trim frame 20 is moved to the position of FIG. 1 to permit access to the cover plate 40 with a slight forward movement of the cover plate permitting the downward tilting thereof as shown in FIG. 4 which is initially facilitated by a sloped front edge of the member 48, as indicated at 48a. The cover plate along with the blower are then removed through the space within the perimeter of the trim frame. These operations are permitted merely by the removal of the screws holding the trim frame and disconnection of the blower with the wires running from the control panel to the interior of the oven casing being sufficient in length to permit the outward movement of the trim frame.

An added feature of this construction is the ease with which the flue pipe can be reached when the oven is in place, since with the trim frame remote from the casing and with the part 18 of the casing top removed, it is possible to reach to a point adjacent the flue fitting 60 to more easily make the flue connection.

I claim:

1. In a built-in oven usable beneath an overlying structure, a casing having an interior oven chamber and an oven door, a casing top panel spaced from said oven chamber, a front trim frame surrounding and extending around the front perimeter of the door, a control panel mounted on said frame, and positioned between said oven chamber and said casing top panel and means mounting said frame for movement relative to the casing and casing top panel to carry the control panel away from the casing for access to the space between the oven chamber and the casing top panel and the back side of the control panel.

2. A built-in oven comprising a casing having an interior oven chamber and an oven door, means within said casing defining an air chamber above said oven chamber with an air inlet adjacent the oven door for venting fumes from the oven chamber when the door is in a partially open position, blower means for drawing air through said air inlet into said air chamber, a trim frame extending around the front perimeter of the oven door, a control panel supported on said trim frame in front of said blower means and normally closing the forward opening of said air chamber, means mounting the trim frame for movement away from the casing, and means mounting the blower means for removal out of the air chamber and through the forward opening occupied by the control panel when the control panel is in its normal position and beneath the control panel.

3. In a built-in oven usable beneath an overlying structure, a casing having an oven chamber and an oven door with an interior panel defining a top of the oven chamber, an air chamber above said panel defined by said panel and walls with one wall spaced from the panel forming a blower support, a blower mounted on said blower support wall with an inlet to said air chamber and an outlet to exhaust, a trim frame around the front perimeter of the oven door, a control panel affixed to an upper part of said trim frame and positioned within the casing above said blower support wall and in front of said blower, means mounting the trim frame for outward pivotal movement away from the casing, and means mounting said blower support wall for removal from the casing through the interior of said trim frame when the trim frame is pivoted away from the casing and the control panel has moved from obstructing relation with said blower.

4. A built-in oven having a casing with an upper chamber above an oven chamber said oven chamber having a front opening, a trim frame extending around the periphery of the front opening, a control panel mounted on said trim frame and removably positioned in said upper chamber, means for moving the trim frame and control panel permitting access to said upper chamber, and a casing top panel separate from said trim frame and control panel overlying said upper chamber, the rear portion of said casing top panel being removably mounted to permit access to the top rear portion of the casing.

5. An oven comprising, a casing having a top panel and an oven chamber with a top wall said oven chamber having a front opening, an air chamber in said casing above the oven top wall defined at bottom and top respectively by said top wall and a cover plate, support means spacing the cover plate from the top wall and defining sides of said air chamber, a blower mounted on said cover plate having an inlet communicating with the air chamber, said support means comprising a pair of elongate ways at opposite sides of the air chamber which are angularly related to approach each other toward the rear of the casing, said cover plate having inwardly and rearwardly tapered sides to overlie said ways when in operative position and to permit lowering of the cover plate toward said top wall upon slight forward movement of the cover plate for ease of removal, means defining an inlet to said air chamber, and removable means adjacent the front of the air chamber permitting withdrawal of the cover plate and blower from the casing when the last mentioned means is removed.

6. An oven as defined in claim 5 in which said removable means comprises, a control panel for the oven and a trim frame for the casing surrounding the outer periphery of the front opening and on which the control panel is carried, and means pivotally mounting the trim frame on the casing at a location remote from the control panel.

7. In a built-in oven adapted for placement in an opening, a casing having a top wall, rear wall and side walls shaped for fitting within an opening, an oven chamber having a front opening disposed within the casing with a top panel defining the bottom of an air chamber, a cover plate spaced from said top panel defining the top of said air chamber, an air blower mounted on said cover plate and having an inlet communicating with said air chamber, means above the oven chamber defining an inlet to the air chamber, a trim frame positioned at the front of said casing and having spaced apart side members lying at either side of said front opening, a control panel for the oven positioned within the casing above said cover plate and fixedly mounted to said trim frame, means mounting said trim frame for movement away from the casing to remove the control panel from the casing and position the upper portions of said trim frame side members at a distance from the casing, support means mounting said cover plate for movement out of the casing, said support means being shaped to permit downward tilting of said cover plate and said air blower and movement through the space between said trim frame side members when the latter members are positioned at a distance from the casing, and a filter removably positioned in said air chamber.

8. In a built-in oven adapted for placement in an opening, a casing having a top wall, rear wall and side walls shaped for fitting within an opening, an open front oven chamber disposed within the casing with a top panel defining the bottom of an air chamber, a cover plate spaced from said top panel defining the top of said air chamber, means at the front of the oven and above the oven chamber defining an air inlet to said air chamber, a trim frame positioned at the front of said casing and having spaced side members lying at either side of the open front of said oven chamber, a control panel for the oven positioned within the casing above said cover plate and fixedly mounted to said trim frame, and means pivotally mounting said trim frame for movement away from the casing in an arc to remove the control panel from the casing and position the upper portion of said trim frame side members at a distance from the casing.

9. In a built-in oven adapted for placement in an opening, a casing having a top wall, rear wall and side walls shaped for fitting within an opening, an open front oven chamber disposed within the casing with a top panel defining the bottom of an air chamber, a cover plate spaced from said top panel defining the top of said air chamber, an air blower mounted on said cover plate and having an inlet communicating with said air chamber, means at the front of the oven and above the oven chamber defining an air inlet to said air chamber, a trim frame positioned at the front of said casing and having spaced side members lying at either side of the open front of said oven chamber, a control panel for the oven positioned within the casing above said cover plate and fixedly mounted to said trim frame, means pivotally mounting said trim frame along the lower edge thereof for movement away from the casing in an arc to remove the control panel from the casing and position the upper portions of said trim frame side members at a distance from the casing, and means mounting said cover plate for movement out of the casing and through the space between said trim frame side members when the latter members are positioned at a distance from the casing.

10. An oven comprising, a casing having a top panel and an oven chamber with a top wall, said oven chamber having a front opening, an air chamber in said casing above the oven top wall defined at bottom and top respectively by said top wall and a cover plate, support means spacing the cover plate from the top wall and defining sides of said air chamber, a blower mounted on said cover plate having an inlet communicating with the air chamber, said support means comprising a pair of elongate ways at opposite sides of the air chamber, said cover plate having inwardly and rearwardly tapered sides to permit lowering of the cover plate toward said top wall upon slight forward movement of the cover plate for ease of removal, means defining an inlet to said air chamber, and removable means adjacent the front of the air chamber permitting withdrawal of the cover plate and blower from the casing when the last mentioned means is removed.

References Cited by the Examiner

UNITED STATES PATENTS

| | | | |
|---|---|---|---|
| 2,002,211 | 5/1935 | Torney | 220—41 X |
| 2,464,473 | 3/1949 | Wessel | 126—110 X |
| 2,702,459 | 2/1955 | Thompson | 62—317 |
| 2,836,114 | 5/1958 | Weaver et al. | 98—115 |
| 2,910,336 | 10/1959 | Mustee | 312—328 |
| 3,032,028 | 5/1962 | Pearce et al. | 126—21 |

FOREIGN PATENTS

| | | |
|---|---|---|
| 232,465 | 2/1961 | Australia. |
| 775,317 | 5/1957 | Great Britain. |
| 792,466 | 10/1935 | France. |
| 1,194,586 | 5/1959 | France. |
| 1,215,647 | 11/1959 | France. |

FREDERICK L. MATTESON, JR., *Primary Examiner.*

J. J. CAMBY, JAMES W. WESTHAVER, V. M. PERUZZI, *Examiners.*